United States Patent
Sasamori et al.

(10) Patent No.: US 7,161,903 B2
(45) Date of Patent: Jan. 9, 2007

(54) CONTROL STATION, APPARATUS AND NETWORK SYSTEM

(75) Inventors: Toshiaki Sasamori, Kyoto (JP); Chiaki Koshiro, Kyoto (JP); Naoaki Ikeno, Kyoto (JP); Takuya Shimomura, Kyoto (JP); Masuhisa Hirata, Kyoto (JP)

(73) Assignee: Omron Corporation, Kyoto (JP)

( * ) Notice: Subject to any disclaimer, the term of this patent is extended or adjusted under 35 U.S.C. 154(b) by 805 days.

(21) Appl. No.: 09/942,023

(22) Filed: Aug. 30, 2001

(65) Prior Publication Data

US 2002/0062410 A1 May 23, 2002

(30) Foreign Application Priority Data

Sep. 1, 2000 (JP) ............................. 2000-265234

(51) Int. Cl.
*H04J 3/14* (2006.01)
*H04J 3/06* (2006.01)
*H04L 12/50* (2006.01)

(52) U.S. Cl. ................. 370/230; 370/358; 370/395.42; 370/503

(58) Field of Classification Search ........ 370/230–236, 370/358, 395.42, 412, 543, 503
See application file for complete search history.

(56) References Cited

U.S. PATENT DOCUMENTS

| | | | |
|---|---|---|---|
| 4,587,650 A | 5/1986 | Bell | |
| 5,463,620 A * | 10/1995 | Sriram | ................. 370/412 |
| 5,818,815 A * | 10/1998 | Carpentier et al. | ...... 370/230.1 |
| 6,111,888 A | 8/2000 | Green et al. | |
| 6,621,792 B1 * | 9/2003 | Petty | ................. 370/230.1 |

FOREIGN PATENT DOCUMENTS

| | | |
|---|---|---|
| JP | 61-108287 | 5/1986 |
| JP | 02-014640 | 1/1990 |
| JP | 9-247192 | 9/1997 |

OTHER PUBLICATIONS

Hong, S.H. et al., "Bandwith allocation scheme in CAN protocol", IEE Proceedings D. Control Theory & Applications, Institution of Electrical Enginers. Stevenage, GB, vol. 147, No. 1, Jan. 25, 2000, pp. 37-44.
J.D. Decotignie et al., "Producer-Distributor-Consumer Model on Controller Area Network", *Proceedings of the IFAC/IFIC Workshop, Real Time Programming*, pp. 35-42, Nov. 6, 1995.

(Continued)

*Primary Examiner*—Afsar Qureshi
(74) *Attorney, Agent, or Firm*—Foley & Lardner LLP

(57) ABSTRACT

A network system for carrying out communication between a control station and a plurality of devices connected to a network. The communication includes data communication which requires real-time attributes and message communication which does not require real-time attributes. The data communication includes a first data communication, and a second data communication. The system includes a plurality of transmission queues for temporarily storing transmission data provided in the control station, wherein one of the queues holds transmission data for the second communication. After the first data communication is carried out in accordance with a predetermined cycle time, an appropriate switching between the message communication and the second communication is carried out in the remaining time of the cycle time to complete one cycle, whereafter the cycle is repeatedly carried out.

15 Claims, 8 Drawing Sheets

OTHER PUBLICATIONS

S. Hong et al., "Bandwidth Allocation Scheme in CAN Protocol", IEE Proceedings D. Control Theory & Applications, Institution of Electrical Engineers, Stevenage, GB, vol. 147, No. 1, pp. 37-44, Jan. 25, 2000.

S. Cavalieri et al., "Jitter-Based Policies to Improve Asynchronous Bandwidth Explotation in Fieldbus Communication Systems", Industrial Electronics, Control and Instrumentation, Proceedings of the 1996 IEEE and IECON 22nd International Conference on Taipei, Tawian, pp. 916-921, Aug. 5, 1996.

S. Cavalieri et al., "CAN Assessment in Time-Critical Cyclic Application Through Petri Net Model", Industrial Electronics, Control and Instrumentation, Proceedings of the 1996 IEEE and IECON 22nd International Conference on Taipei, Tawian, pp. 922-927, Aug. 5, 1996.

S. Cavalieri et al., "Exploiting FDDI communication features to connect Fieldbuses in Process Control Environment", Local Computer Networks, 1994, 19th Conference on Minneapolis, MN, USA, IEEE Computer Soc, pp. 59-66, Oct. 2, 1994.

S. Cavalieri et al., "Enhancing Performance in Fieldbus Communication Systems"; Emerging Technologies and Factory Automation, 1996. IEEE Conference on Kauai, HI, USA, pp. 609-615, Nov. 18, 1996.

* cited by examiner

CONTROL STATION, APPARATUS AND NETWORK SYSTEM

CROSS-REFERENCE TO RELATED PATENT APPLICATIONS

Priority Application JP 2000-265234, filed Sep. 1, 2000 including the specification, drawings, claims and abstract, is incorporated herein by reference in its entirety.

FIELD OF THE INVENTION

The present invention is related to a control station, apparatus and network system.

DESCRIPTION OF PRIOR ART

In networks that possess an I/O communication function and a message communication function, the communication band assigned to the I/O communication and the message band assigned to message communication are established in advance as network parameters, and the transmission and reception of data is carried out based on these established parameters.

Now, because such I/O communication carries out the transmission and reception of data having real-time attributes such as ON/OFF data of a sensor or the like, the terms "I/O phase" and "/O message" are used. The I/O phase includes a Poll Command/Response which utilizes a polling method to transmit output data (OUT data) from a master station to slave stations (i.e., a Command is made), and then utilizes a (response) communication system to receive input data (IN data) from each of the slave stations, and a Bit-Strobe Command/Response Message which transmits the OUT data to all the slave stations and receives the IN data therefrom. Furthermore, the I/O phase includes cyclic transmission of data at prescribed time intervals, and Change of State (COS) transmission at the times when the data changes. Also, these latter two transmissions (Cyclic, COS) are given particularly high priority.

On the other hand, because the message communication establishes parameters, reads out data, and transmits and receives data having low priority such as transferred files and the like, the terms "Explicit phase" and "Explicit message" are used.

For example, in the case where the network system (e.g. a Device Net (Registered Trademark) or the like) includes one master station for controlling communication in the network, and a plurality of slave stations which communicate with the master station to transmit and receive data, the master station will transmit data to each slave station and receive data from each slave station in a sequential manner. In the case of a FA (factory automation) network, when the transmission of all the OUT data by the master station to the slave stations followed by the reception of all the IN data therefrom forms one cycle, the system which depends on such network will operate by repeating this cycle.

However, in the case of Explicit phase, because the priority is lower than that of the I/O phase, all transmissions and receptions do not need to be carried out in one cycle. In this regard, as shown in FIG. 1, the time of one cycle is established in advance, and the system first carries out communication of the Poll/Bit Strobe phase (Poll Command/Response +Bit-Strobe Command/Response Message) which is the I/O phase, and then carries out communication of the Explicit phase. At this time, because all the data requiring transmission in one cycle is transmitted and received in the Poll/Bit Strobe phase, and because the time interval of each cycle is fixed, the Explicit phase transmission is carried out within the remaining time of such cycle.

Further, the master station which controls the transmission and reception of such data has an internal structure like that shown in FIG. 2. Namely, the master station is equipped with an I/O application process portion 1 for transmitting the I/O phase, and an Explicit application process portion 2 for transmitting the Explicit phase, and each process portion 1, 2 refers to a network parameter table 3 to supply data requiring transmission to a transmission queue 4 when a transmission timing arrives. In this way, transmission data is transmitted to prescribed clients via a transmission process portion 5 in a sequential manner starting from the head of the transmission queue 4.

In other words, as is well known, because queues have a FIFO (First-In-First-Out) type data structure, first the I/O application process portion 1 supplies transmission data requiring transmission in the current cycle to the transmission queue 4. In this regard, the time required for the current transmission is known from the total quantity of such recorded transmission data. Then, because one cycle time is recorded in the cycle time column of the network parameter table 3, and because the time required for transmitting the Explicit phase can be calculated, the Explicit application process portion 2 supplies the Explicit phase that can be transmitted in such calculated time to the transmission queue 4. Thereafter, by repeating the process described above, the transmission data transmitted from the transmission process portion 5 can be transmitted in accordance with the transmission schedule shown in FIG. 1.

In this connection, the various parameters stored in the network parameter table 3 are recorded based on data sent from a host controller, a tool apparatus and the like connected to the master station. Further, because the quantity of I/O data that needs to be sent in one cycle is determined from the sensor numbers and the like present in the network system, the transmission time of the Poll/Bit Strobe phase is also known. Further, the time required for transmitting the Explicit phase (message) is determined after the desired time of one cycle (i.e., the cycle time) is given.

Incidentally, in the case where, for example, a large-volume message (Explicit phase) is transmitted, it will take a long time to finish transmitting all of the message when processing is carried out according to the normal cycle described above, and depending on the contents to be transmitted for making changes, there is a need to send such changes collectively to make desired changes to the memory contents of each slave station. As an example, in a FA network system for controlling the production line of a certain product A, in the case where the same production line is used to manufacture another product B, because the I/O information communicated between the master station and each of the slave stations needs to be changed, and because various setup changes need to be made, there are cases where messages for such setup changes need to be transmitted.

In such case, corresponding changes can be carried out by lengthening the cycle time, which has the effect of lengthening the transmission time of the message (Explicit phase) in one cycle. However, as shown in FIG. 2, because the cycle time is recorded in the network parameter table 3, network parameter changes need to be carried out in order to change the cycle time. Consequently, network parameter changes are carried out while the I/O communication is placed in a suspended state, and this lowers the real-time attributes of the I/O communication that requires real-time operation.

Furthermore, there is the problem that the initialization must be redone from the beginning each time the apparatus is suspended.

On the other hand, during the transmission of the message (Explicit phase), it is not possible to transmit other data. In other words, in the case where there arises a need to transmit a COS/Cyclic phase during the transmission of a large-volume message (Explicit phase) in one cycle after the cycle time has been lengthened, the I/O application process portion 1 records transmission data of such COS and the like in the transmission queue 4 at the time its own transmission timing arrives. Namely, transmission data of such COS and the like is transmitted after the completion of the cycle. Accordingly, there exists the problem that the lag in the transmission timing of the transmission data of the COS phase and the like requiring urgency grows longer as the volume of data of the message (Explicit phase) becomes larger.

Further, even when it is assumed that the I/O application process portion 1 can carry out an interruption process and record such transmission data in the transmission queue 4 in the case of a COS phase and the like, in any case, the COS phase can only be transmitted after the data previously stored in the transmission queue 4 is transmitted, and this creates a time lag up the actual transmission.

SUMMARY OF THE INVENTION

In view of the problems of the prior art described above, it is an object of the present invention to provide a control station and a network system which make it possible to change the communication band (time, data quantity) of a message while carrying out I/O communication. Further, it is another object of the present invention to provide a control station, a control apparatus and a network system which make it possible to ensure the real-time transmission of data (I/O data and the like of COS, Cyclic phase and the like) requiring real-time attributes regardless of the width of the communication band of the message.

In the network system according to the present invention, communication is carried out between a control station and a plurality of devices connected to a network. Further, the communication carried out by this network system includes data communication that requires real-time attributes and message communication that does not require real-time attributes, and the data communication includes a first data communication in which data is transmitted from the control station to the devices and data in response to this transmission is transmitted from the devices to the control station, and a second data communication in which data is transmitted from the control station at a prescribed timing.

In this regard, the control station includes a plurality of transmission queues for temporarily storing transmission data, with one of the queues holding transmission data for the second communication, and after the first data communication is carried out in accordance with a predetermined cycle time, an appropriate switching between the message communication and the second communication is carried out in the remaining time of the cycle time to complete one cycle, whereafter the cycle is repeatedly carried out.

Further, the control station preferably used for constructing this network station, namely, in the network system for carrying out communication between a control station and a plurality of devices connected to a network, wherein such communication includes data communication which requires real-time attributes and message communication which does not require real-time attributes, and wherein the data communication includes a first data communication in which data is transmitted from the control station to the devices and data in response to this transmission is transmitted from the devices to the control station, and a second data communication in which data is transmitted from the control station at a prescribed timing, the control station preferably includes a plurality of transmission queues for temporarily storing transmission data, wherein one of the queues holds transmission data for the second communication; and control means for extracting appropriate data from the plurality of transmission queues, wherein after the first data communication is carried out in accordance with a predetermined cycle time, the control means carries out an appropriate switching between the message communication and the second communication in the remaining time of the cycle time to complete one cycle, whereafter the cycle is repeatedly carried out.

In the preferred embodiments, this control station corresponds to the master station 10 (which may be referred to simply as the master or parent station), and the devices correspond to the slave stations 11 (which may be referred to simply as the slaves or child stations). Further, in the preferred embodiments, the first data communication corresponds to the communication of the Poll/Bit Strobe phase, and the second data communication corresponds to the COS/Cyclic communication. In this regard, the second communication carries out communication of high-priority data in the data requiring real-time attributes.

In the preferred embodiments, three transmission queues are provided to correspond with the transmission data, but roughly the same effects can be achieved by providing at least two transmission queues. Further, by using one of these transmission queues for the second data communication, because it is possible to hold high-priority data independently in a transmission queue, it becomes possible to first carry out transmission of other data at required times.

Further, by providing a control means at the downstream side (output side) of the plurality of queues, it is possible to transmit the transmission data held in each queue in any desired order, and this makes it possible to transmit the other data described above first. Further, because the second data communication having particularly high priority can be transmitted in this way even while the message communication is being carried out, it is possible to ensure the second data communication, namely, the real-time attributes even in the case where there is a need to transmit a large-volume message.

Further, even though the switching of the message communication and second data communication are described in the preferred embodiments as being carried out alternately one packet at a time, the present invention is not limited to this arrangement, and it is also possible to carry out switching at a ratio of n times to one time and the like, and switching can be carried out according to any desired timing.

Furthermore, even though the first data communication and the second data communication were described in the preferred embodiments as being carried out alternately, the present invention is not necessarily limited to this arrangement, and it is also possible to carry out only the first data communication or carry out switching at a ratio of n times to one time and the like, and switching can be carried out according to any desired timing.

In another network system of the present invention for carrying out communication between a control station and a plurality of devices connected to a network, wherein such communication includes data communication which requires real-time attributes and message communication which does not require real-time attributes, the network system includes a function provided in the control station for independently establishing a cycle time for communication, wherein the established cycle time is referenced at each communication cycle to determine the current cycle time, and wherein after the data communication is carried out, the message communication is carried out in the remaining time of the established cycle time to complete one cycle, whereafter the cycle is repeatedly carried out.

Further, the control station preferably used for constructing this network station, namely, in a network system for carrying out communication between the control station and a plurality of devices connected to a network, wherein such communication includes data communication which requires real-time attributes and message communication which does not require real-time attributes, the control station preferably includes a function for independently establishing a cycle time; means for determining the current cycle time by making reference to the independently established cycle time at each communication cycle, wherein after the data communication is carried out, the message communication is carried out in the remaining time of the cycle time to complete one cycle; and means for repeatedly carrying out such cycle.

In this regard, the function of independently establishing the cycle time in the preferred embodiments is achieved by providing a cycle time storage area 26 to store a separate cycle time, and an establishment portion 33 to change the storage contents thereof. Further, the means for determining the cycle time in the preferred embodiments is achieved by a phase control portion 32. Furthermore, the means for repeatedly carrying out the cycle is also achieved by the phase control portion 32.

In accordance with the present invention, the cycle time can be independently changed during communication, and because changes to the cycle time of the next communication can be influenced by reference to the cycle time at each cycle, it becomes possible to dynamically change the cycle time. Accordingly, when there is a lot of data for the message communication, by dynamically increasing the cycle time, it is possible to widen the communication time (communication band) for the message communication without suspending communication, and this makes it possible to carry out message transmission in a short time.

Further, the two network systems described above can be achieved at the same time. Namely, it is possible to construct a network system where the cycle time is dynamically changed, and the message communication and the second data communication are switched during the communication carried out at each cycle.

Further, the control station preferably used for constructing this network station, namely, in a network system for carrying out communication between the control station and a plurality of devices connected to a network, wherein such communication includes data communication which requires real-time attributes and message communication which does not require real-time attributes, and wherein the data communication includes a first data communication in which data is transmitted from the control station to the devices and data in response to this transmission is transmitted from the devices to the control station, and a second data communication in which data is transmitted from the control station at a prescribed timing, the control station preferably includes a plurality of transmission queues for temporarily storing transmission data, wherein one of the queues holds transmission data for the second communication; control means for extracting appropriate data from the plurality of transmission queues, wherein after the first data communication is carried out in accordance with a predetermined cycle time, the control means carries out an appropriate switching between the message communication and the second communication in the remaining time of the cycle time to complete one cycle, whereafter the cycle is repeatedly carried out; a function for independently establishing the cycle time; and a function for establishing the current cycle time by making reference to the independently established cycle time at each communication cycle.

Furthermore, in another network system of the present invention for carrying out data communication which requires real-time attributes and message communication which does not require real-time attributes, the network system includes a control station and a plurality of devices connected to a network, wherein the control station includes a function to independently establish the total volume of message data transmitted in the next cycle during communication, and wherein the devices carry out communication in manner that does not exceed the total volume of message communication established by the control station at each communication cycle.

Further, the control station preferably used for constructing this network station, namely, in a network system for carrying out communication between the control station and a plurality of devices connected to a network, wherein such communication includes data communication which requires real-time attributes and message communication which does not require real-time attributes, the control station preferably includes a function to independently establish the total volume of message data transmitted in the next cycle during communication, and control means which carries out a control process to ensure the devices carry out communication in manner that does not exceed the total volume of message communication established by the control station at each communication cycle.

This invention is achieved by the third embodiment. Also, the devices correspond to the nodes in the third embodiment. Further, the total volume of the message communication is the total volume of the message communication transmitted by each node in one communication cycle, and this total volume may be established by the data volume (data length), the communication time, the number of nodes capable of communication or the like.

In accordance with this invention, even in a network that carries out N:N communication, it is possible to change the total volume of the message that can be transmitted in one communication cycle while communication is being carried out.

Further, the device according to the present invention that is used in a network system for carrying out communication between a control station and a plurality of devices connected to a network preferably includes a plurality of transmission queues for temporarily storing transmission data, means for storing transmission data in the plurality of transmission queues, control means for extracting appropriate data from the plurality of transmission queues, and transmission means for transmitting transmission data extracted by the control means, wherein at least one of the transmission queues holds transmission data requiring priority transmission.

In this regard, in the preferred embodiments, the device corresponds to the slave station 11 (which may be referred to simply as the slave or child station). Further, even though the device was described in the preferred embodiments as being provided with two transmission queues, it is of course possible to provide three or more transmission queues.

Furthermore, in the preferred embodiments, the means for storing the transmission data corresponds to each application process portion 30', 31', and the control means corresponds to the phase control portion 32'. Also, in the preferred embodiments, the queue which stores the transmission data requiring priority transmission corresponds to the COS queue 27'b.

Further, each of such means operates in this way to hold transmission data requiring priority transmission in one prescribed transmission queue. Namely, when transmission data requiring priority transmission is generated, the storage means records the priority transmission data in such one prescribed transmission queue, and in accordance with a prescribed algorithm, the control means functions to extract such priority transmission data before extracting the transmission data held in the other queues. In this regard, there are of course cases where such priority extraction is carried out immediately when transmission data exists in such prescribed transmission queue, but there are also cases where priority transmission is carried out, for example, by increasing the number of times and frequency each transmission queue is examined in order to make the waiting time shorter than that for the other transmission data. Further, even if it is assumed that the number of examinations are equal, in the case where the number of priority transmission data generated per unit time is smaller than the number of general transmission data, because the priority transmission data that is generated after the general transmission data will be transmitted first, such cases are also included. Of course, the algorithm described above may be used for any other example.

In accordance with the present invention, because a separate transmission queue is provided to hold priority transmission data, it is possible to communicate high-priority transmission data even while carrying out communication of general low-priority transmission data.

Now, it should be noted that the structural elements of the present invention described above may be combined in any possible way. Further, each means that make up the control station of the present invention can be achieved by exclusive hardware circuits or by a programmed computer.

DETAILED DESCRIPTION OF THE PREFERRED EMBODIMENTS

Figure 1:
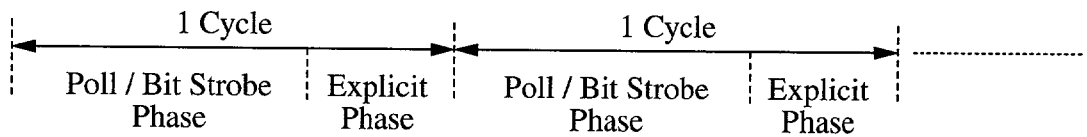
FIG. 1 is a drawing showing a prior art example.
Figure 2:
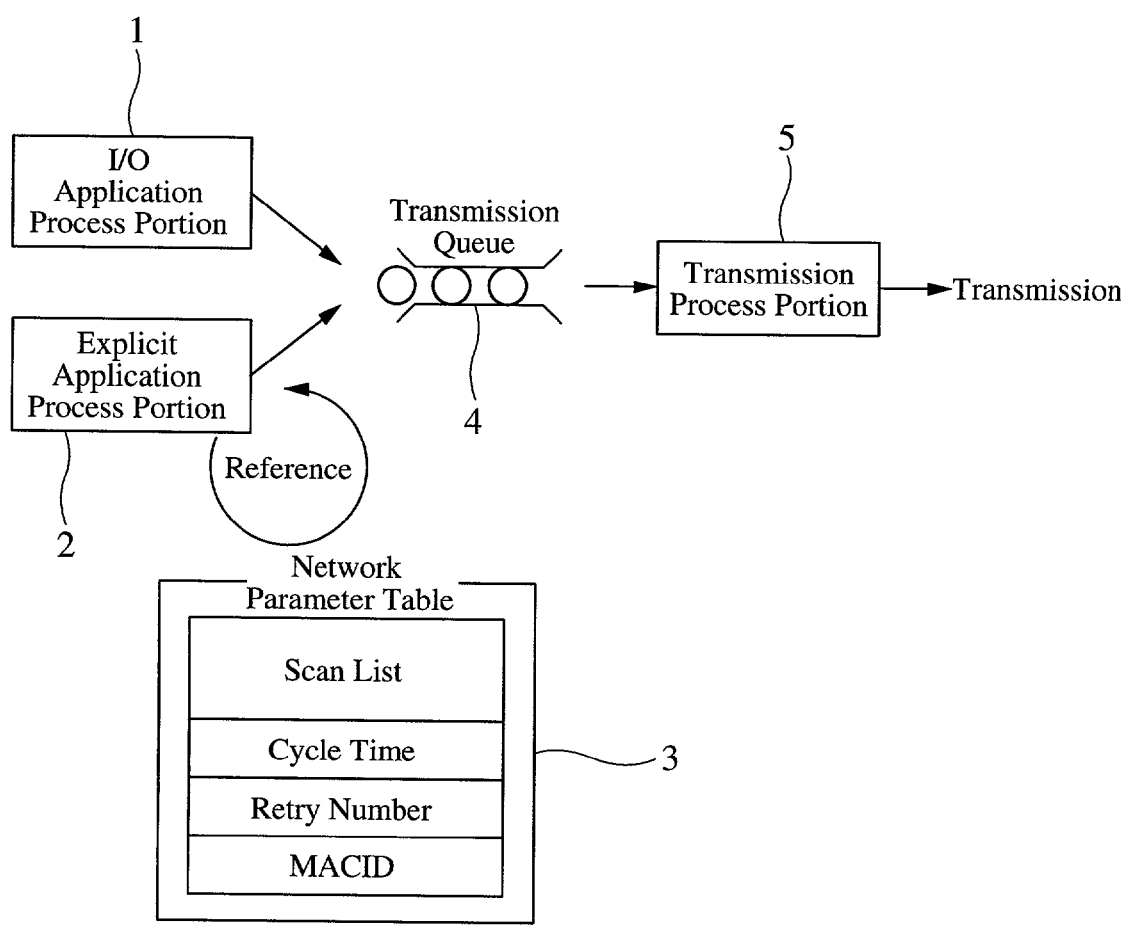
FIG. 2 is another drawing showing a prior art example.
Figure 3:
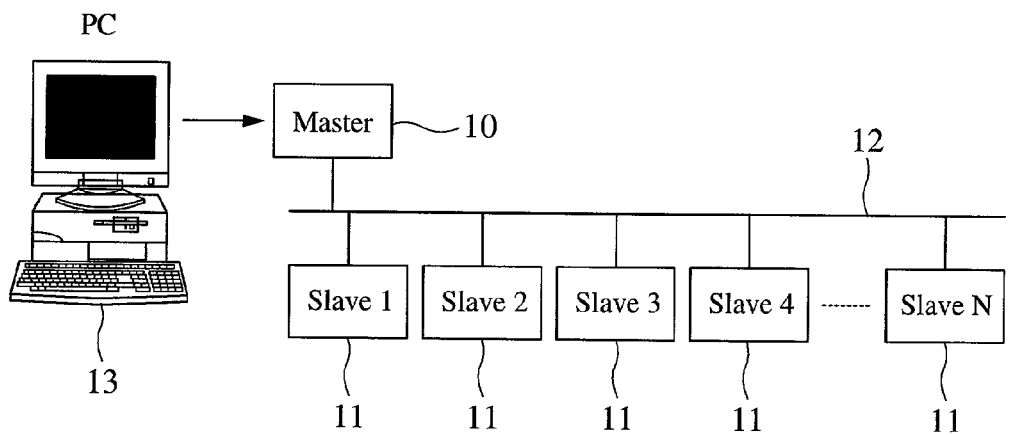
FIG. 3 is a drawing showing an example of a network system to which the present invention is applied.

FIG. 3 shows an example of a network system to which the present invention is applied. As shown in this drawing, one master station 10 and a plural number of (N number of) slave stations 11 are connected to a transmission line 12 of a device net (registered trademark) which is a component-type network or the like, and the transmission and reception of data are carried out via this transmission line 12. Further, the master station 10 can be connected to a tool apparatus 13 which supplies the master station 10 with operating conditions.

In this network system, a CAN protocol is used at a lower order layer, and a device net protocol is operated thereabove. Further, the master station 10 functions as a control station to control the operations of the network. In other words, the master station 10 controls the transmission and reception of data in the network.

During one cycle in the present embodiment, the master station 10 first transmits an I/O message which forms an I/O communication function, and then using the remaining communication time (communication band) carries out transmission of an Explicit message (Explicit phase) which forms a message communication function to each of the slave stations 11. Further, the I/O message includes the three types of information mentioned in the description of the prior art.

Figure 4:
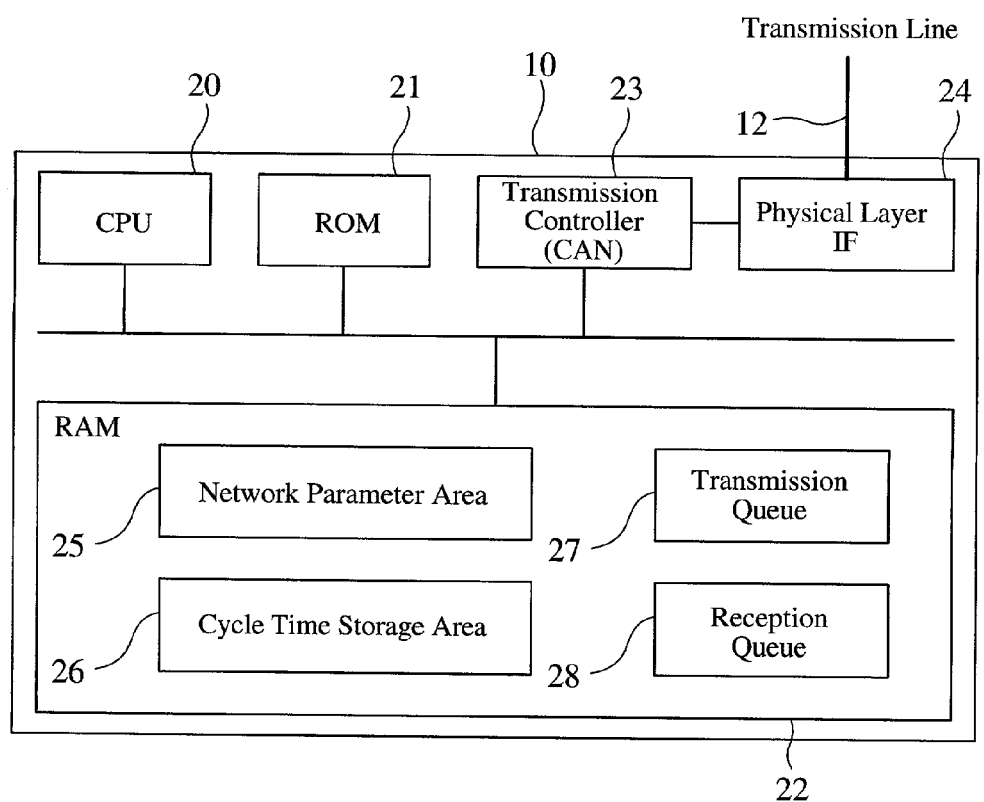
FIG. 4 is a drawing showing a first embodiment of a master station.
Figure 5:
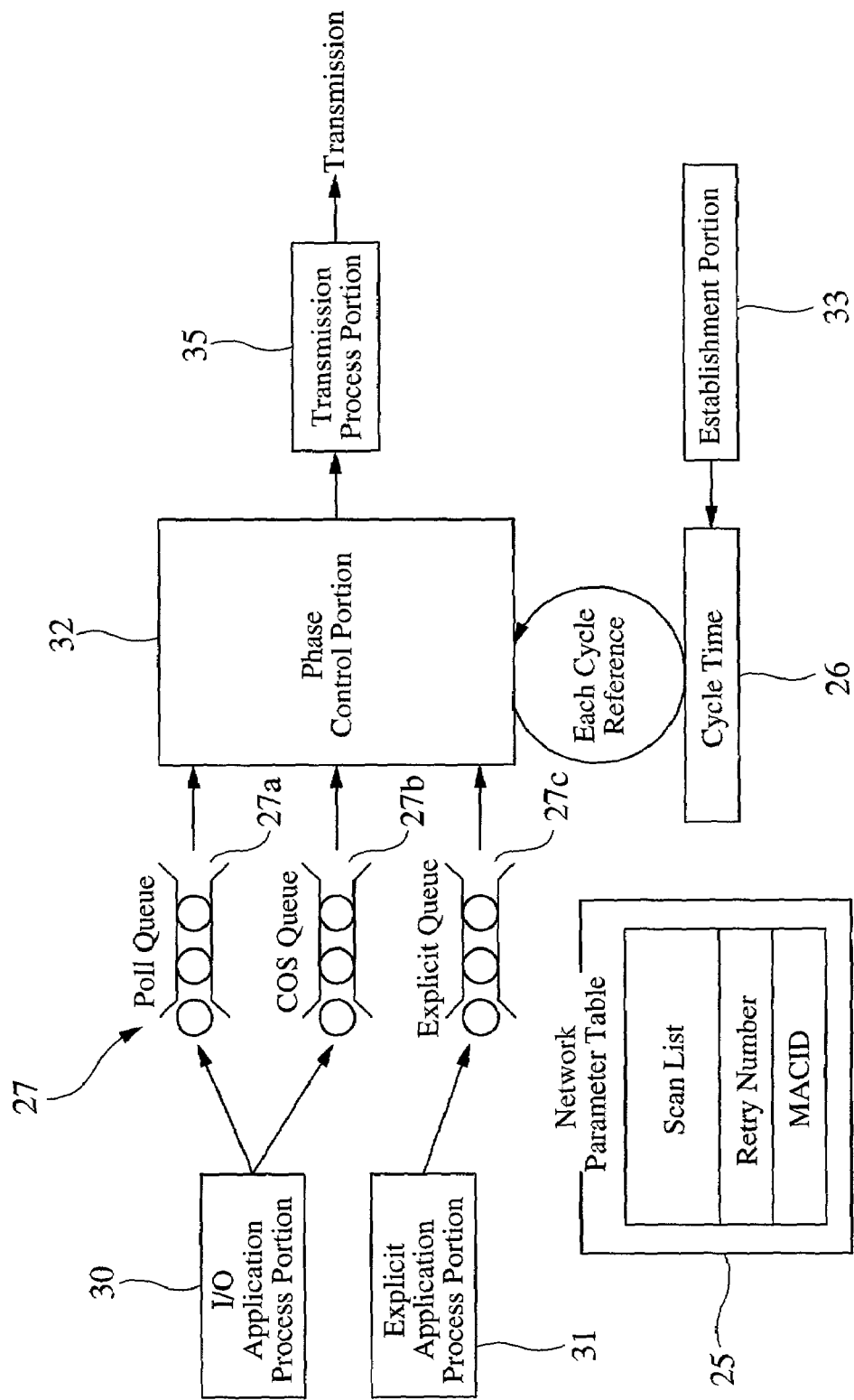
FIG. 5 is another drawing showing the first embodiment of a master station.

The internal structure of the master station 10 connected to this network is shown in FIG. 4 and FIG. 5. Namely, as shown in FIG. 4, the hardware structure of the master station 10 is equipped with a CPU 20 which carries out various actual processes, a ROM 21 which stores programs for the processes carried out by the CPU 20 and other data, a RAM 22 for storing a work area and various data, a communication controller 23 for carrying out communication of data between the master station 10 and the other slave stations 11, and a physical layer IF (interface) 24 which is connected to the transmission line 12. Further, the RAM 22 includes a network parameter area 25 for storing a network parameter table, a cycle time storage area 26 for storing the cycle time, a transmission queue 27 for temporarily holding transmission data, and a reception queue 28 for temporarily holding reception data.

In the structure shown in FIG. 4, the cycle time storage area 26 is provided so as to be separate and independent of the network parameter area 25, and this forms a special feature of the structure. Namely, as will be described later, if the cycle time storage area 26 is made independent, then when data is updated for this cycle time storage area 26, there will be no need to carry out an updating process for the network parameter table. As a result, it is possible to update the cycle time storage area 26 while operating the message communication function and the I/O communication function which is operated based on data stored in the network parameter table. Further, because the cycle time of one cycle changes in accordance with such update, the time required for transmitting the message also changes. Accordingly, the cycle time can be changed dynamically during operation of the network system of the I/O communication and the like.

FIG. 5 shows the software structure of the master station 10. As was also shown in FIG. 4, the network parameter table and the cycle time are stored respectively in the separate areas 25, 26. The scan list in the network parameter table stores address information and the like for respectively storing OUT data and IN data communicated between the master station 10 and each slave station 11. In other words, because the address (including the case of a pointer or the like) for storing OUT data for a certain node number slave station 11 can be univocally determined from the scan list, the data stored in such address may be transmitted to such node number slave station 11. Further, in the case of IN data, because data received from a certain node number slave station 11 is stored in such address, in the case where a command is sent to another slave station 11 based on this received data, it is understood that the data stored in this address may be inspected.

Further, the transmission queue 27 prepares three queues, namely, a Poll queue 27*a*, a COS queue 27*b* and an Explicit queue 27*c*. In this regard, the Poll queue 27*a* stores a Poll/Bit strobe phase which includes a Poll command/response message and a Bit-Strobe command/response message, and the COS queue 27*b* stores Change of State (COS) and Cyclic transmission data. Further, an I/O application process portion 30 records required transmission data in the Poll queue 27*a* and the COS queue 27*b* in accordance with the classification of such data.

Furthermore, because the I/O application process portion 30 receives commands from a control portion (not shown in the drawings) which controls all the processes of the master station 10, and records transmission data in each queue, except for the separation of the Poll queue 27*a* and the COS queue 27*b*, the recording priority has basically the same function as that in the prior art. Namely, in accordance with the scan list recorded in the network parameter table and MACID information and the like, transmission data is extracted, and a frame which includes required information such as the node number (MACID) of the address or transmission source in the head portion of the extracted data, the type of data, the length of data and the like is created and recorded in a prescribed queue.

Further, because the Explicit queue 27*c* holds the Explicit phase that needs to be transmitted, the Explicit application process portion 31 records the required transmission data. Now, in contrast with the prior art Explicit application process portion 2 which recorded the Explicit phase in one transmission queue at a prescribed timing in cooperation with the I/O application process portion 1, in the present embodiment, because the recording priority forms the exclusive-use Explicit queue 27*c*, the Explicit application process portion 31 can carry out successive recording independently of the operation of the I/O application process portion 30. Further, the other process functions are the same as those of the prior art.

Furthermore, in the present embodiment, a phase control portion 32 is provided to retrieve each data recorded in the three queues 27*a*~27*c* in a prescribed order starting from the head of each queue, and then transmit such retrieved data via a transmission process portion 35. In this regard, the determination of which queue to retrieve data from the head thereof is carried out according to a pre-determined phase control rule.

Figure 6:
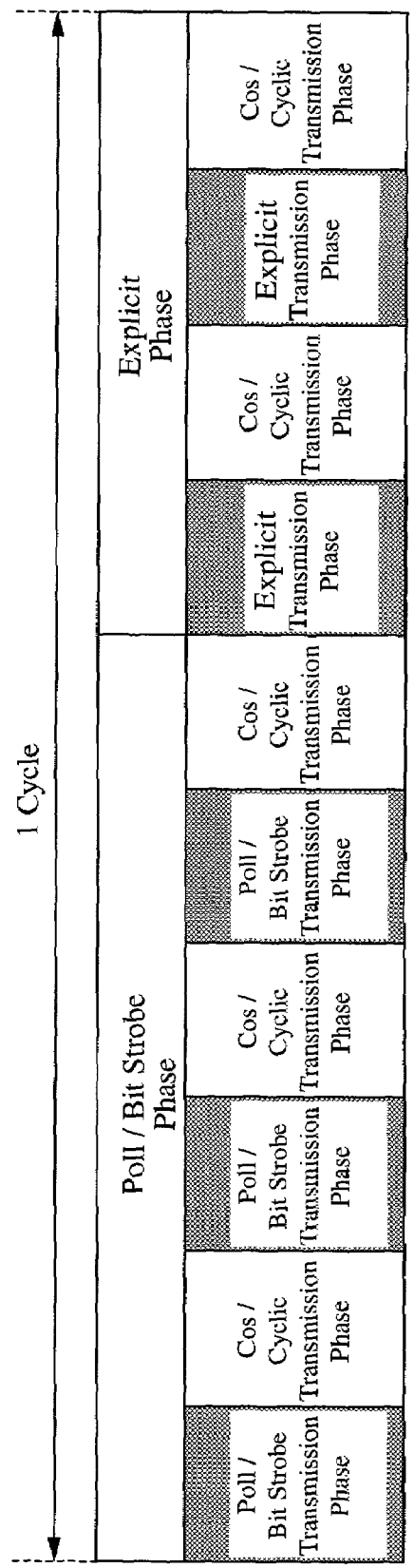
FIG. 6 is a drawing showing a phase control rule.

As shown in FIG. 6, this phase control rule carries out data communication in one cycle unit. Further, communication of the Poll/Bit Strobe phase which is an I/O communication function is carried out in the same manner as in the prior art, and after such communication, the remaining time of the established cycle time is used to carry out communication of the Explicit phase which is a message communication function. Furthermore, the phase control portion 32 accesses the cycle time storage area 26 at each cycle to retrieve the cycle time stored therein, and then calculates the time (communication band) that will enable communication of the above-described Explicit phase.

Figure 7:
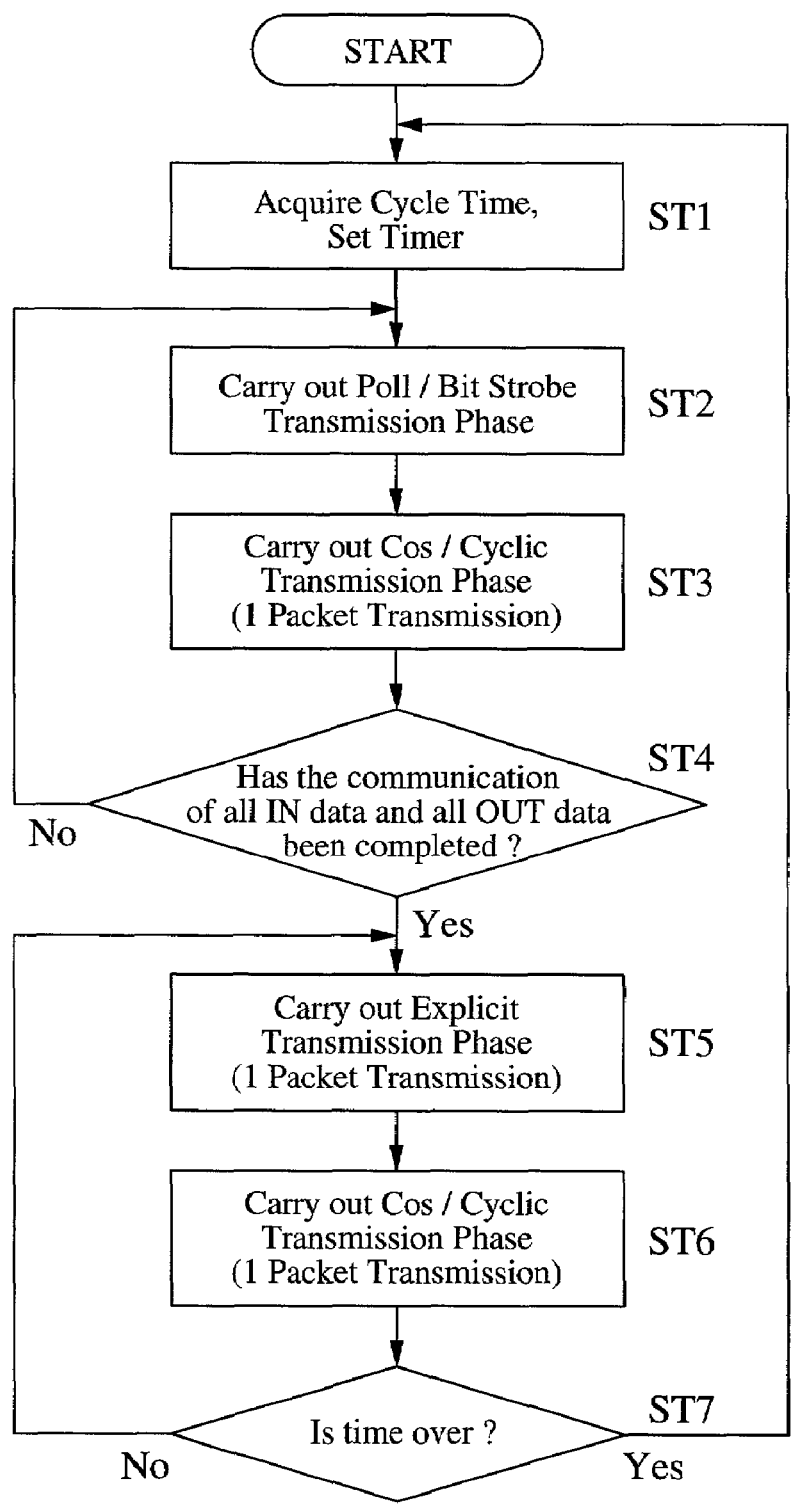
FIG. 7 is a flow chart showing the function of a phase control portion.

In this connection, the specific phase control process is carried out in accordance with the flow chart shown in FIG. 7. First, the cycle time is acquired, and a timer is set based on the acquired cycle time (communication band) (ST1). This timer is the type where the timer value decreases with the passage of time. Accordingly, when the timer value reaches 0, the current cycle is finished.

Next, the Poll/Bit Strobe transmission phase is carried out (ST2). Namely, transmission data (OUT data) held in the Poll queue 27*a* from the head to a prescribed number is transmitted. Of course, because the slave stations 11 that receive such transmission (command) will subsequently transmit IN data (a response) back, the master station 10 will receive such responses. After that, the COS/Cyclic transmission phase is carried out by transmitting the transmission data held in the COS queue 27*b* one packet at a time starting from the head thereof (ST3). Further, at this time, in the case where transmission data does not exist in the COS queue 27*b*, this COS/Cyclic transmission phase is skipped (i.e., transmission is not carried out), and the process moves to the next transmission phase.

Then, until the communication of all the IN data and all the OUT data has been completed, the processes of Steps 2 and 3 are repeatedly carried out (ST4). In this regard, because the I/O phase that needs to be communicated in one cycle is known, the judgement of whether or not the communication of all the IN data and all the OUT data has been completed can be carried out, for example, by judging whether or not the phase control portion 32 has retrieved and transmitted a related one-cycle portion of transmission data from the Poll queue 27*a*. Further, if the I/O application process portion 30 has recorded transmission data of the Poll/Bit Strobe transmission phase of one cycle in the Poll queue 27*a*, then recording will be suspended for a prescribed period of time. Then, when Steps 2 and 3 are repeatedly carried out, the phase control portion 32 alternately accesses the Poll queue 27*a* and the COS queue 27*b* to retrieve transmission data from the head thereof and carry out a transmission process, and in the case where there is no transmission data in the Poll queue 27*a*, it is possible to judge that the Poll/Bit Strobe phase requiring transmission in the current communication cycle is complete. Furthermore, it is also possible to make a judgement of completion in the case where the master station 10 which is the control station does not receive IN data over a prescribed period of time, and various other methods can be employed. Then, when the communication of all the IN/OUT data has been completed, the Poll/Bit Strobe phase is finished, and the process moves to the Explicit phase.

In the Explicit phase, first, the Explicit transmission phase is carried out by transmitting the transmission data held in the Explicit queue 27*c* one packet at a time starting from the head thereof (ST5). After that, the COS/Cyclic transmission phase is carried out by transmitting the transmission data held in the COS queue 27*b* one packet at a time starting from the head thereof (ST6). Further, at this time, in the case where transmission data does not exist in the COS queue 27*b*, this COS/Cyclic transmission phase is skipped (i.e., transmission is not carried out), and the process moves to the next transmission phase.

Then, each of the processes of Step 5 and Step 6 are repeated until the cycle time is over (ST7), and because communication based on the current cycle is completed when the cycle time is over, the processes carried out for the next cycle will start again at Step 1.

In this way, because the COS/Cyclic transmission data which requires especially requires real-time attributes can be successively transmitted during one cycle, it is possible to ensure COS/Cyclic real-time attributes even in the case where the communication band (communication time) of the Explicit phase is long.

Furthermore, because three separate queues are provided, each transmission data can be recorded in a respective queue without concern over the presence of other types of data. For example, because only COS/Cyclic data is held in the COS queue 27b, even in the case where this COS/Cyclic data is recorded in the COS queue 27b after transmission data has been recorded in the Explicit queue 27c, it is possible to transmit the COS/Cyclic data first.

Moreover, because three separate queues are provided, and because the retrieval of data held in each queue is carried out by the phase control portion 32, the switching of each phase can be carried out reliably, and it is possible to transmit desired data at a desired timing.

Further, as show in FIG. 5, the present embodiment is provided with an establishment portion 33 for updating the stored contents of the cycle time storage area 26, wherein the cycle time can be updated independently by the establishment portion 33. This updating can be carried out, for example, by rewriting the cycle time in accordance with an updating command received from the host computer and the tool apparatus 13 or the like.

For example, after the phase control portion 32 refers to the cycle time written in the cycle time storage area 26 when Step 1 shown in FIG. 7 is carried out, when the establishment portion 33 rewrites the data stored in the cycle time storage area 26 during the time it takes to move to the next cycle, because the cycle time will have already been updated when the phase control portion 32 accesses the cycle time storage area 26 during the next cycle, processes are carried out in accordance with such updated new cycle time. Then, because the communication band (process time of the Poll/Bit Strobe phase) of the I/O communication is roughly fixed, in the case where it is assumed that the cycle time increases, the communication band (process time of the Explicit phase) of the message communication will increase.

Accordingly, in a network which is connected to a control apparatus and slave stations, for example, in the case where the recipe data (application operation data) for operating the control apparatus is changed, there is a desire to lengthen the process time of the Explicit phase from the need to send recipe data having a relatively large data volume, but in the present embodiment, because the establishment portion 33 updates the cycle time recorded in the cycle time storage area 26, the cycle time is changed without stopping the normal I/O communication process and the like, and this makes it possible to complete the transmission of large-volume recipe data within a short time. Furthermore, as was described above, because the COS/Cyclic transmission phase can be transmitted alternately one packet unit at a time, it is possible to ensure real-time attributes.

Figure 8:
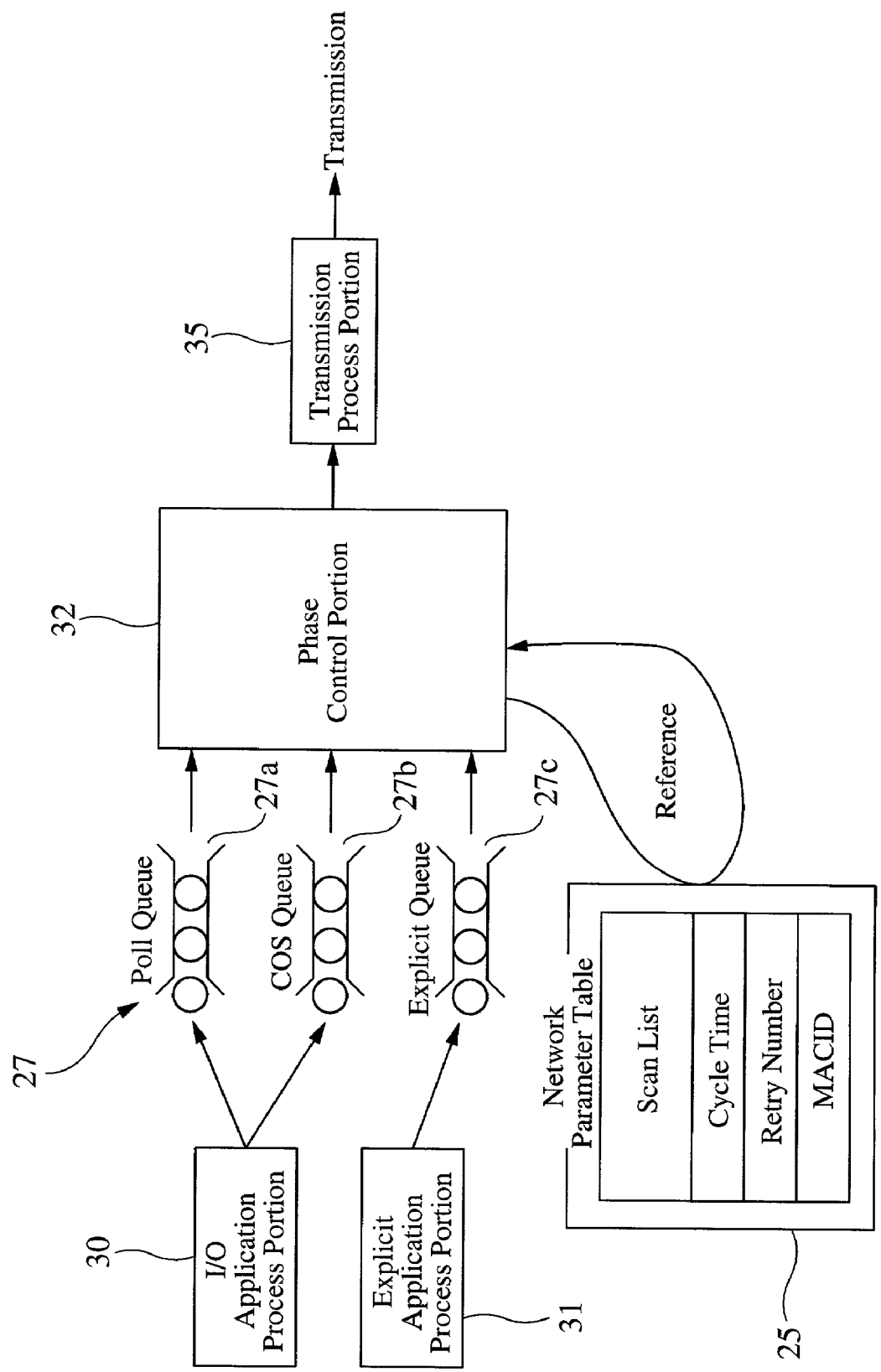
FIG. 8 is a drawing showing a second embodiment of a master station.

Next, FIG. 8 shows a second embodiment of the present invention. In this embodiment, the cycle time is stored in the network parameter table in the same manner as the prior art. Namely, in the case where the cycle time is changed, the updating process needs to be carried out while the I/O communication and the like are in a temporary suspended state.

Further, in basically the same manner as the flow chart shown in FIG. 7, the phase control portion 32 acquires transmission data stored in the three queues 27a~27c in an appropriate order, and then transmits such acquired data via the transmission process portion 35. Furthermore, in the present embodiment, because the cycle time is not changed during operations, the reading in of the cycle time of Step 1 does not necessarily have to be carried out at each cycle, and if the cycle time is acquired once by an initialization or the like, thereafter the timer may be set based on such cycle time. Of course, there is no problem if a reference is made each time. Further, because the other structures and the operating effects are the same as those of the first embodiment described above, a detailed description thereof will be omitted.

Further, although the three separate transmission queues 27a~27c are described in the embodiments above, the present invention does not necessarily need three separate queues. Namely, it is sufficient to provide at least the separate COS queue 27b. However, in this case, because the same common queue is used for both the transmission data of the Poll/Bit Strobe and the transmission data of the Explicit, the Explicit application process portion refers to the established cycle time, and records the transmission data of one complete cycle in the common queue. Further, the phase control portion carries out control to retrieve data alternately from the head of the common queue and the COS queue.

Figure 9:
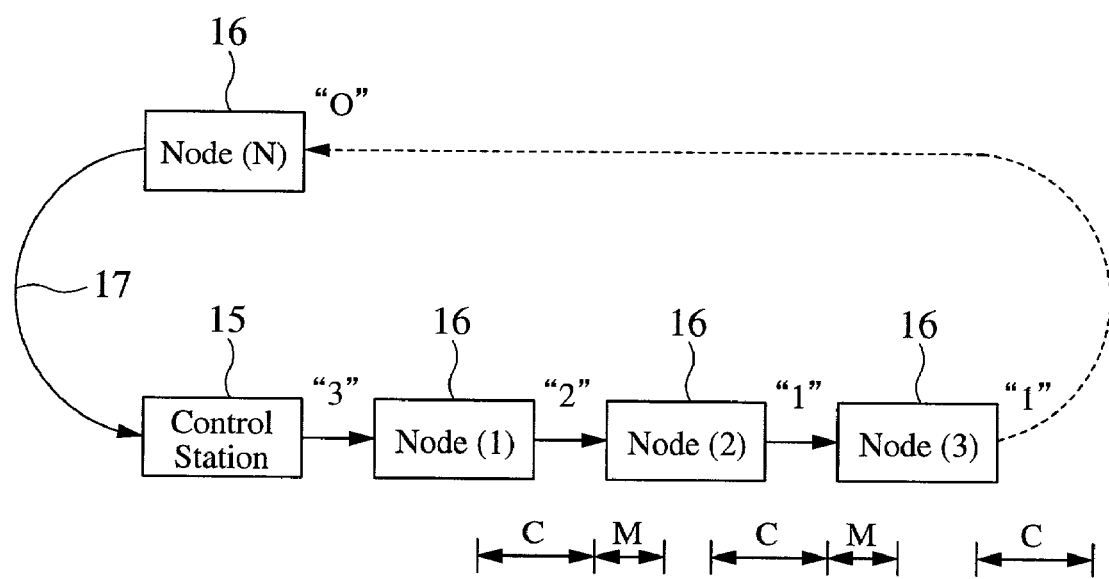
FIG. 9 is a drawing showing a third embodiment of the present invention.

Next, FIG. 9 shows the third embodiment of the present invention. This embodiment is applied to an N:N network system which is different from that of the previous embodiments described above. Namely, the network is constructed of one control station 15 and a plurality of nodes 16 connected via a transmission line 17. The control station 15 includes a function for controlling the communication cycle time, and may be an exclusive-use station or a station used jointly by the nodes.

In the present embodiment, communication between nodes is carried out by a token passing method. Namely, a FA network has a Cyclic data communication function (i.e., the I/O phase in the embodiments described above) and a message communication function (i.e., the Explicit phase in the embodiments described above), and the communication of Cyclic data requiring real-time attributes is prioritized in one communication cycle, with the remaining time being used to carry out the message communication function.

As is well known, in the token passing method, the node that receives a token has the right to transmit data, and this makes it possible to transmit Cyclic data and message data. At this time, the length of the message data that can be communicated within one communication cycle is added to the token frame. Then, in the case where there is message data that needs to be transmitted, each node 16 detects the data length of the approved message of the token frame, and in the case where such length is not 0, the message data is transmitted, and then the length of this transmitted data is subtracted from the length of the message data that can be transmitted within one communication cycle recorded in the token frame to create a new token frame which is then outputted. On the other hand, in the case where the data length stored in the token frame is 0, it is not possible to transmit message data in such communication cycle.

In this way, it is possible to restrict the data volume of the message data that can be transmitted in one communication cycle. Further, by providing a function to independently establish the data volume of the message data that can be transmitted, and by changing the data length of the message that can be transmitted within one communication cycle every time the control station outputs a token frame during each communication cycle, it is possible to dynamically control the communication band.

In this regard, an upper limit may or may not be established in advance for the data length of the message transmitted by each node. In the example of such operations shown in FIG. 9, because "3" is given as the data length of the message that can be communicated, when the node (1) transmits Cyclic data (C) and message data (M) having a data length of "1", the communicable data length stored in the token frame received by the node (2) will be "2". Then, when this node (2) also outputs a message having a data length of "1", the communicable data length stored in the token frame will be "1". Further, in the case where a message is not transmitted by the next node (3), the data length will continue to be "1". Then, in the case where the data length becomes zero upon reaching the node (N) as data is transmitted from each node of the network, it will become impossible to transmit a message even when message data needs to be transmitted by such node (N).

Further, the dynamic changes of the communication band (transmission volume) in one communication cycle are not limited to the token passing method described above, and it is also possible, for example, to apply a time-division communication method in the same manner. Namely, because a control station for controlling communication exists, by having the control station transmit trigger frames in such time-division communication method, it is possible to have designated (approved) nodes output a Cyclic transmission phase and a message transmission phase.

Namely, because a trigger frame for Cyclic transmission is transmitted first, each node that receives such trigger frame will begin transmitting Cyclic data. When the transmission of such Cyclic data is completed, the control station transmits a message transmission trigger frame which includes the nodes that are designated/approved to transmit message data, and such designated/approved nodes can be arranged to transmit only one packet of message data.

In such case, a function for independently establishing node number information which makes it possible to transmit a message in one communication cycle is provided, and when the control station generates the trigger frame, only the approved node number is sequentially designated by referring to the node number information. For example, in the case where the approved node number is 3, a trigger frame which approves message transmission by the first through third nodes is generated for the first communication, and a trigger frame which approves message transmission by the fourth through sixth nodes is generated for the second communication. At this time, in the case where the established value of the node number information is changed to 5 before the second communication, a trigger frame which approves message transmission by the fourth through eighth nodes is generated. In this way, be controlling the increase and decrease of the node number which makes it possible to transmit a message in one communication cycle, it is possible to dynamically control changes of the communication band.

Figure 10:
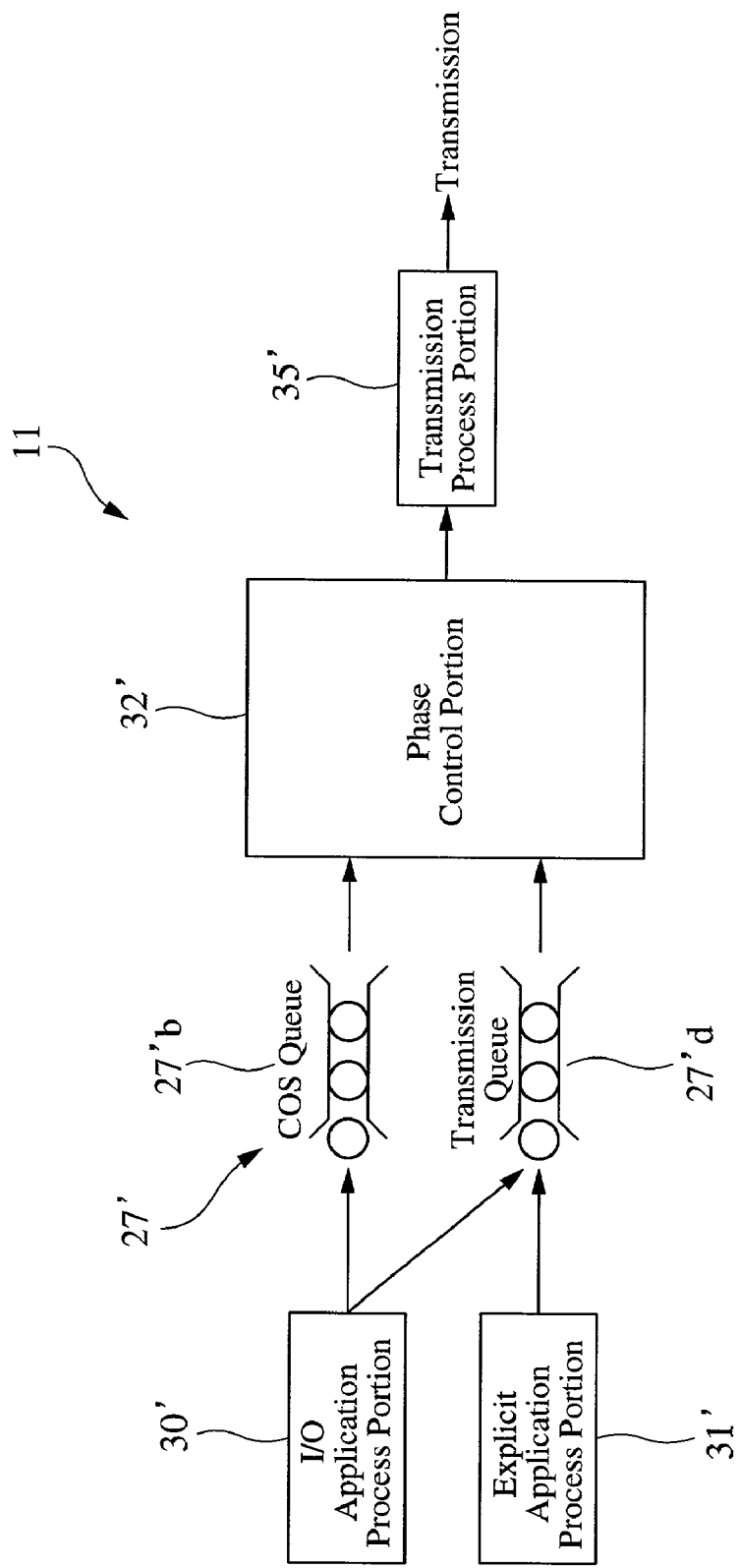
FIG. 10 is a drawing showing a fourth embodiment of the present invention.

Next, FIG. 10 shows a fourth embodiment of the present invention. In this regard, while the all the previous embodiments described above were examples of the present invention applied to the control station side such as the master station or the like, the present embodiment is an example of the present invention applied to the other device (i.e., the slave station 11). This slave stations 11 is connected to the network system shown in FIG. 3, for example, in the same manner as described in the first embodiment.

As shown in FIG. 10, the slave station 11 is provided with a plurality of transmission queues 27', namely, a COS queue 27'*d* for holding Cyclic transmission data and Change of State (COS) transmission data which is a high-priority transmission data, and a transmission queue 27'*d* for holding other transmission data. In other words, the transmission queue 27'*d* holds I/O data outside the COS and Cyclic data, and Explicit messages.

Further, this slave station 11 is equipped with an I/O application process portion 30' and an Explicit application process portion 31', and transmission data is recorded in each queue in accordance with commands received from a control portion (not shown in the drawings) which controls all the processes of the slave station 11. In this regard, except for the provision of the separate COS queue 27'*b* and the transmission queue 27'*d*, the recording priority of the I/O application process portion 30' of the present embodiment has basically the same function as the prior art. Namely, transmission data is extracted, and a frame which includes required information such as the node number (MACID) of the address or transmission source in the head portion of the extracted data, the type of data, the length of data and the like is created and recorded in a prescribed queue. Then, high-priority COS or Cyclic data is recorded in the COS queue 27'*b*, and other I/O data is recorded in the transmission queue 27'*d*.

Further, the Explicit application process portion 31' records messages requiring transmission in the transmission queue 27'*d*. As for the other process functions, they are the same as those of the prior art.

Furthermore, in the present embodiment, a phase control portion 32' is provided to retrieve each of the transmission data recorded in the two queues 27'*b*, 27'*d* in a prescribed order starting from the head of each queue, and then transmit such retrieved data via a transmission process portion 35'. In this regard, the determination of which queue to retrieve data from the head thereof is carried out according to a predetermined phase control rule.

Moreover, even though the present embodiment is described as having two transmission queues, it is of course possible to provide three separate queues, namely, a Poll queue, a COS queue and an Explicit queue in the same manner as was done for the master station.

As described above, by making it possible to independently change the cycle time and the like, the present invention makes it possible to change the communication band (time/data volume) of the message while carrying out I/O communication. Further, even in the case where data requiring real-time attributes are transmitted during the message transmission, it is possible to ensure the real-time transmission of such data (I/O data and the like of COS, Cyclic phase and the like) requiring real-time attributes regardless of the width of the communication band of the message. Accordingly, it becomes possible to quickly transmit required data.

What is claimed is:

1. A network system for carrying out communication between a control station and a plurality of devices connected to a network and controlled by the control station, wherein the communication includes data communication which requires real-time attributes and message communication which does not require real-time attributes, comprising:

a plurality of transmission queues for temporarily storing transmission data provided in the control station, wherein the data communication includes a first data communication in which data is transmitted from the control station to the devices and data in response to this transmission is transmitted from the devices to the control station, and a second data communication in which data is transmitted from the control station at a prescribed timing, the second data communication transmitting data of a higher priority than the first data communication, wherein one of the queues holds transmission data for the second data communication;

wherein after the first data communication is carried out in accordance with a predetermined cycle time, an appropriate switching between the message communication and the second data communication is carried out in the remaining time of the cycle time to complete one cycle, whereafter the cycle is repeatedly carried out.

2. The network system of claim 1, wherein the second data communication includes at least one of cyclic data or change of state (COS) data.

3. A network system for carrying out communication between a control station and a plurality of devices connected to a network and controlled by the control station, wherein the communication includes data communication which requires real-time attributes and message communication which does not require real-time attributes, comprising:

an establishment portion provided in the control station for independently establishing a cycle time for communication, wherein the data communication includes a first data communication in which data is transmitted from the control station to the devices and data in response to this transmission is transmitted from the devices to the control station, and a second data communication in which data is transmitted from the control station at a prescribed timing;

wherein the established cycle time is referenced at each communication cycle to determine the current cycle time; and wherein after the first data communication is carried out, the message communication is carried out in the remaining time of the established cycle time to complete one cycle, whereafter the cycle is repeatedly carried out.

4. The network system of claim 3, wherein the second data communication includes at least one of cyclic data or change of state (COS) data.

5. A control station for use in a network system for carrying out communication between the control station and a plurality of devices connected to a network and controlled by the control station, wherein the communication includes data communication which requires real-time attributes and message communication which does not require real-time attributes, comprising:

a plurality of transmission queues for temporarily storing transmission data, wherein the data communication includes a first data communication in which data is transmitted from the control station to the devices and data in response to this transmission is transmitted from the devices to the control station, and a second data communication in which data is transmitted from the control station at a prescribed timing, the second data communication transmitting data of a higher priority than the first data communication, wherein one of the queues holds transmission data for the second data communication; and control means for extracting appropriate data from the plurality of transmission queues;

wherein after the first data communication is carried out in accordance with a predetermined cycle time, the control means carries out an appropriate switching between the message communication and the second data communication in the remaining time of the cycle time to complete one cycle, whereafter the cycle is repeatedly carried out.

6. The control station of claim 5, further comprising:

an establishment portion for independently establishing the cycle time, and for establishing the current cycle time by making reference to the independently established cycle time at each communication cycle.

7. The control station of claim 5, wherein the second data communication includes at least one of cyclic data or change of state (COS) data.

8. A control station for use in a network system for carrying out communication between the control station and a plurality of devices connected to a network and controlled by the control station, wherein the communication includes data communication which requires real-time attributes and message communication which does not require real-time attributes, comprising:

an establishment portion of the control station for independently establishing a cycle time, wherein the data communication includes a first data communication in which data is transmitted from the control station to the devices and data in response to this transmission is transmitted from the devices to the control station, and a second data communication in which data is transmitted from the control station at a prescribed timing;

means for determining the current cycle time by making reference to the independently established cycle time at each communication cycle, wherein after the first data communication is carried out, the message communication is carried out in the remaining time of the cycle time to complete one cycle; and means for repeatedly carrying out the cycle.

9. The control station of claim 8, wherein the second data communication includes at least one of cyclic data or change of state (COS) data.

10. A network system for carrying out data communication which requires real-time attributes and message communication which does not require real-time attributes, comprising:

a control station and a plurality of devices connected to a network and controlled by the control station, and wherein the data communication includes a first data communication in which data is transmitted from the control station to the devices and data in response to this transmission is transmitted from the devices to the control station, and a second data communication in which data is transmitted from the control station at a prescribed timing;

wherein the control station includes a volume establishment portion configured to independently establish the total volume of message data transmitted between the control station and the devices in the next cycle during communication; and wherein the devices carry out communication in a manner that does not exceed the total volume of message communication established by the control station at each communication cycle.

11. The network system of claim 10, wherein the second data communication includes at least one of cyclic data or change of state (COS) data.

12. A control station for use in a network system for carrying out communication between the control station and a plurality of devices connected to a network and controlled by the control station, wherein the communication includes data communication which requires real-time attributes and message communication which does not require real-time attributes, comprising:

a volume establishment portion configured to independently establish the total volume of message data transmitted between the control station and the devices in the next cycle during communication, wherein the data communication includes a first data communication in which data is transmitted from the control station to the devices and data in response to this transmission is transmitted from the devices to the control station, and a second data communication in which data is transmitted from the control station at a prescribed timing; and control means which carries out a control process to ensure the devices carry out communication in manner that does not exceed the total volume of message communication established by the control station at each communication cycle.

13. The control station of claim 12, wherein the second data communication includes at least one of cyclic data or change of state (COS) data.

14. A device for use in a network system for carrying out communication between a control station and a plurality of devices connected to a network and controlled by the control station, comprising:

a plurality of transmission queues for temporarily storing transmission data including data communication data which requires real-time attributes and message communication data which does not require real-time attributes, and wherein the data communication includes a first data communication in which data is transmitted from the control station to the devices and data in response to this transmission is transmitted from the devices to the control station, and a second data communication in which data is transmitted from the control station at a prescribed timing, the second data communication transmitting data of a higher priority than the first data communication;

means for storing transmission data in the plurality of transmission queues;

control means for extracting appropriate data from the plurality of transmission queues; and transmission means for transmitting transmission data extracted by the control means;

wherein at least one of the transmission queues holds second data communication data, and at least one of the transmission queues holds both first data communication data and message communication data.

15. The device of claim 14, wherein the second data communication includes at least one of cyclic data or change of state (COS) data.

* * * * *